US00RE37069E

(19) United States
(12) Reissued Patent
Tjandrasuwita et al.

(10) Patent Number: US RE37,069 E
(45) **Date of Reissued Patent: *Feb. 27, 2001**

(54) DATA STREAM CONVERTER WITH INCREASED GREY LEVELS

(75) Inventors: Ignatius B. Tjandrasuwita, Union City; James E. Margeson, III, Santa Clara, both of CA (US)

(73) Assignee: Chips & Technologies, LLC, Santa Clara, CA (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/520,528

(22) Filed: Aug. 29, 1995

Related U.S. Patent Documents

Reissue of:
(64) Patent No.: 5,422,654
Issued: Jun. 6, 1995
Appl. No.: 08/210,257
Filed: Mar. 18, 1994

U.S. Applications:

(63) Continuation of application No. 07/778,799, filed on Oct. 17, 1991, now abandoned.

(51) Int. Cl.[7] ..... G09G 3/36
(52) U.S. Cl. ..... 345/103; 345/3
(58) Field of Search ..... 345/89, 98, 99, 345/103, 147, 104, 214, 3

(56) References Cited

U.S. PATENT DOCUMENTS

| | | | |
|---|---|---|---|
| 4,112,423 | 9/1978 | Bertolasi | 345/156 |
| 4,684,935 | 8/1987 | Fujisaku et al. | 345/1 |
| 4,694,348 | 9/1987 | Kamiya et al. | 348/793 |
| 4,739,320 | 4/1988 | Dolinar et al. | 345/78 |
| 4,745,485 * | 5/1988 | Iwasaki | 345/98 |
| 4,746,981 | 5/1988 | Nadan et al. | 345/127 |
| 4,760,387 | 7/1988 | Ishii et al. | 345/3 |
| 4,766,427 | 8/1988 | Abe et al. | 345/116 |
| 4,797,667 | 1/1989 | Dolinar et al. | 345/208 |
| 4,816,816 | 3/1989 | Usui | 345/103 |
| 4,875,036 | 10/1989 | Washizuka et al. | 345/104 |
| 4,930,010 | 5/1990 | MacDonald | 345/147 |
| 4,982,183 | 1/1991 | Flegal et al. | 345/79 |
| 4,985,698 | 1/1991 | Mano et al. | 345/103 |
| 5,010,325 | 4/1991 | Ziuchkovski | 345/76 |
| 5,017,914 | 5/1991 | Uchida et al. | 345/89 |
| 5,018,076 * | 5/1991 | Johary et al. | 345/516 |
| 5,053,764 | 10/1991 | Barbier et al. | 345/148 |
| 5,187,578 | 2/1993 | Kohgami et al. | 345/148 |
| 5,309,168 | 5/1994 | Itoh et al. | 345/3 |
| 5,309,170 | 5/1994 | Takashi et al. | 345/89 |
| 5,400,044 | 3/1995 | Thomas | 345/147 |

FOREIGN PATENT DOCUMENTS

| | | | |
|---|---|---|---|
| 90/12389 * | 10/1990 | (WO) | 340/784 |

* cited by examiner

*Primary Examiner*—Steven J. Saras
*Assistant Examiner*—Paul A. Bell
(74) *Attorney, Agent, or Firm*—D'Alessandro & Ritchie

(57) ABSTRACT

[The present invention relates to] An apparatus for converting cathode ray tube (CRT) *data* to a dual panel data stream [to be utilized. The present invention] includes a frame buffer system for displaying data on a dual panel display, which comprises an upper and lower panel. The frame buffer system receives CRT data and displays panel refresh data in which one CRT frame generates [one panel refresh frame] *four panel refresh frames*. Through the use of this system, An increased number of gray level patterns can be provided, thereby increasing image resolution and quality.

6 Claims, 5 Drawing Sheets

100

0=LOWER HALF OF CRT FRAME
1=UPPER HALF OF CRT FRAME

| FRAME NUMBER | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| (a) 28/32 | 0 | 0 | 1 | 1 | 1 | 1 | 1 | 1 | 1 | 1 | 1 | 1 | 1 | 1 | 1 | 1 | 0 | 0 | 1 | 1 | 1 | 1 | 1 | 1 | 1 | 1 | 1 | 1 | 1 | 1 | 1 | 1 |
| (b) 29/32 | 0 | 1 | 1 | 1 | 1 | 1 | 1 | 1 | 1 | 1 | 1 | 1 | 1 | 1 | 1 | 1 | 0 | 0 | 1 | 1 | 1 | 1 | 1 | 1 | 1 | 1 | 1 | 1 | 1 | 1 | 1 | 1 |

FIGURE 3

DATA STREAM CONVERTER WITH INCREASED GREY LEVELS

Matter enclosed in heavy brackets [ ] appears in the original patent but forms no part of this reissue specification; matter printed in italics indicates the additions made by reissue.

This is a continuation of application Ser. No. 07/778,799, filed on Oct. 17, 1991, now abandoned.

FIELD OF THE INVENTION

The present invention relates to an apparatus for converting cathode ray tube (CRT) data streams to multi-segment data streams and, more particularly, includes a frame buffer system for displaying data on a dual panel display, which comprises upper and lower panels. The frame buffer system receives CRT data and displays panel refresh data in which one CRT frame generates [two] *four* panel refresh frames. Through the use of this system, an increased number of gray level patterns can be provided, thereby increasing image resolution and quality.

BACKGROUND OF THE INVENTION

It is well known that it is important to convert cathode ray tube (CRT) data streams into multi-segment data streams when displaying graphics data on a multi-segment display. A CRT display controller produces a data stream that begins with the top line to be displayed and outputs successive lines until the bottom of the frame is reached. However, displays that utilize multiple segments require input data in a different order than the CRT displays because all of the segments are refreshed simultaneously.

More particularly, data to refresh these display segments are often output in a parallel manner rather than in the sequential manner associated with CRT displays. In such multiple segment display systems multiple streams of data are required, one.stream per display segment. During the active video portion of the frame, one line in each segment is driven. At the start of the refresh frame, the data for the first line of each segment is output to that segment. When that line is completed, the next line of each segment is output. Successive lines are sent to the display segments until the end of the longest segment is reached.

A technique that has been utilized to produce multiple data streams is to alter the order that the data is read from the display image buffer where the image is stored prior to being displayed. This type of system is disclosed in U.S. Pat. No. 5,018,076, entitled, "Method and Circuitry for Dual Panel Displays," and assigned to assignee of the present application. Although this type of system works satisfactorily in many applications, there are some disadvantages:

(1) If the display controller also interfaces to a CRT, then it must be able to function in either mode, requiring a larger, more complicated controller implementation.

(2) If the controller must generate data streams for the CRT and multi-segment displays simultaneously, the data streams must be read from the display image buffer independently, requiring approximately twice the data bandwidth from the buffer.

(3) Reading data from multiple segments of the display image buffer results in a non-contiguous address order, preventing use of DRAM page mode techniques commonly implemented to increase memory bandwidth.

Another technique is to use a plurality of FIFO's to create delayed versions of the data stream as described in U.S. Pat. No. 4,816,816, entitled, "Liquid Crystal Display Apparatus," assigned to Casio; and in U.S. patent application Ser. No. 334,059, assigned to Cirrus Logic, Inc., entitled, "Converter for Raster Image Data from Single Segment to Multi-Segment Streams".

A problem with the above mentioned frame buffer system is in the generation of gray level patterns on panels where gray levels are generated by changing display patterns from frame to frame. A system as above described requires that lines of data from the CRT format data streams be displayed on the panels for two consecutive frames: first, when input to the frame buffer occurs and, second, when read from the frame buffer. This presents a particular problem in that the number of gray levels that can be displayed are substantially reduced (in this case by one-half) when utilizing the above mentioned system. Twice as many gray levels can be displayed by a system that provides unique data each panel refresh frame.

Therefore, what is desirable is to provide a frame buffer system that can overcome the above-mentioned problem. By increasing the number of gray levels that can be displayed on a dual panel display, image resolution and, hence, quality is improved.

SUMMARY OF THE INVENTION

The present invention is a frame buffer system for displaying data on a dual panel display, the dual panel display including an upper and lower panel, and is a frame buffer system for receiving cathode ray tube (CRT) data and displaying panel refresh data in which one CRT frame generates [two] *four* panel refresh frames. The frame buffer system comprises first means for generating a gray level pattern from the CRT data frame for the current upper and lower panel refresh frames; second means for generating a gray level pattern from the CRT data frame for the next upper and lower panel refresh frames; means coupled to the first generating means for providing the current upper panel refresh frame to the upper panel, responsive to a first state of a control signal if the current panel refresh frame occurs during the upper half of the CRT data frame and for providing the current lower panel refresh frame to the lower panel responsive to a second state of a control signal if the current panel refresh frame occurs during the lower half of the CRT data frame; means for delaying the next panel refresh frame; and means coupled to the second generating means and the delaying means for providing the delayed next lower panel refresh frame to the lower panel responsive to the first state of a control signal if the delayed next panel refresh frame occurs during the upper half of the CRT data frame and for providing the delayed next upper panel refresh frame to the upper panel responsive to the second state of a control signal if the delayed next panel refresh frame occurs during the lower half of the CRT data frame.

BRIEF DESCRIPTION OF THE DRAWINGS

FIG. 3 is a diagram showing two examples of gray level patterns in a dual panel display.

DETAILED DESCRIPTION OF THE PREFERRED EMBODIMENT

The present invention relates to an improvement in the conversion of cathode ray tube (CRT) display data stream to a multi-segment data stream to be utilized by a multiple panel display. The following description is presented to enable one of ordinary skill in the art to make and use the invention as provided in the context of a patent application and its requirements. Various modifications to the preferred embodiment will be readily apparent to those of ordinary skill in the art and the generic principles defined herein may be applied to the embodiments. Thus, the present invention is not intended to be limited to the refinement shown but is to be accorded the widest scope consistent with the principles and novel features described herein.

As has been before mentioned, some prior art systems for converting CRT data streams to multi-segment data streams have required altering the order that data is read from a display image buffer. This technique is presently being utilized in several existing products. As has also been before mentioned, this technique has the following disadvantages: If the controller must interface to a CRT, then the controller must function in either mode, making it more complicated. If the controller must generate data streams for the CRT and multi-segment displays simultaneously, then approximately twice as much display buffer bandwidth than the CRT-only case is required. Finally, reading data information from multiple sections of the display buffer prevents use of the DRAM page mode techniques.

Figure 1:
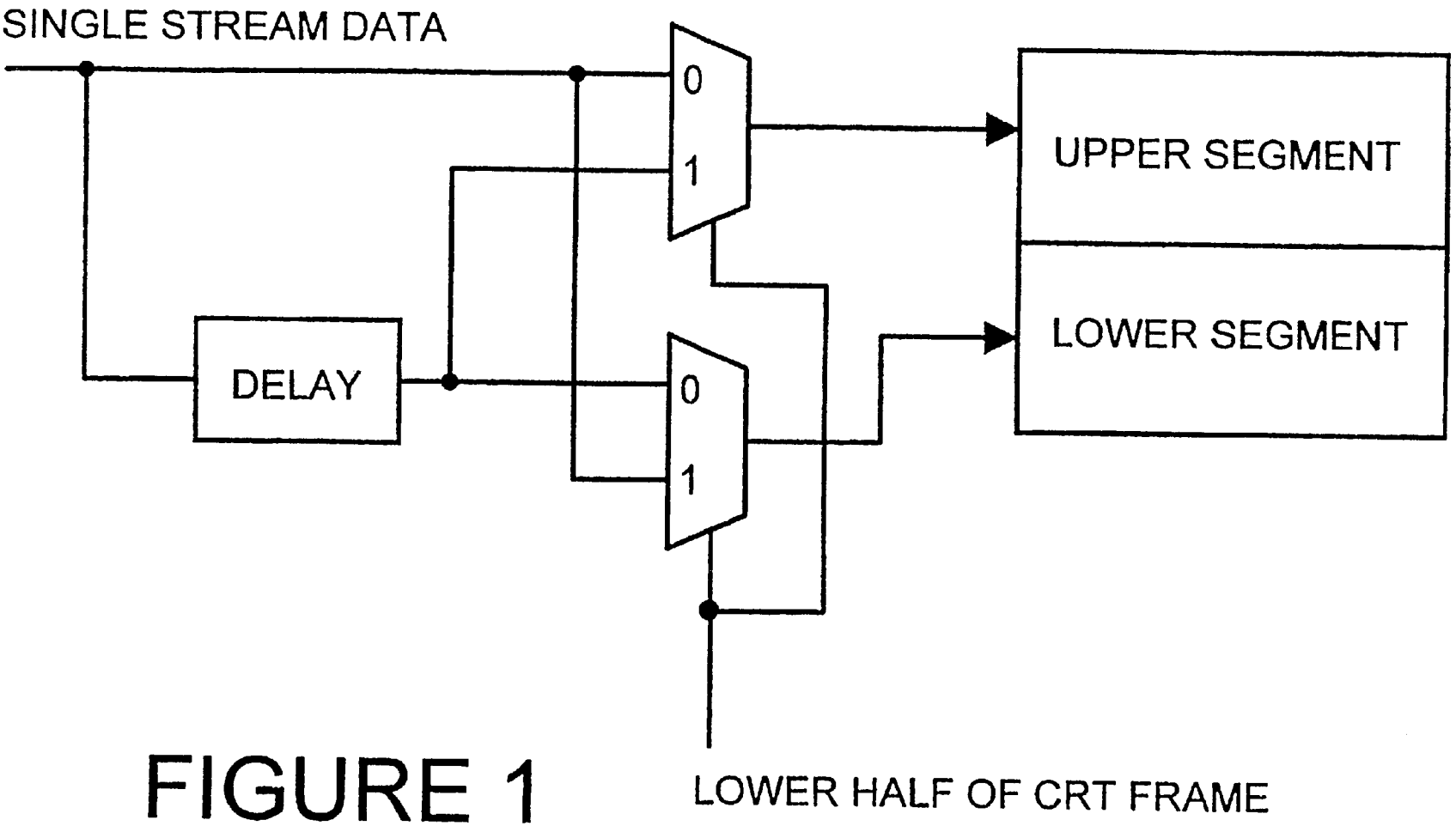
FIG. 1 is a diagram of a prior art half frame buffer scheme.

As has been before mentioned, another prior art technique is disclosed in U.S. Pat. No. 4,816,816 and in U.S. patent application Ser. No. 334,059, that creates delayed versions of the CRT data stream through the use of a particular frame buffer architecture. FIG. 1 shows the architecture used to produce a converted multi-segment data stream.

Referring now to FIG. 1, as is seen, the single stream raster data is supplied to the upper segment of the display during the upper half of the CRT frame, and is supplied to the lower segment during the second half of the CRT frame. The single stream raster data is also supplied to a FIFO that delays the stream by one half CRT frame. The output data stream from the FIFO is supplied to the lower segment of the display during the first half of the CRT frame, and to the upper segment during the last half. Although this type of system is an improvement over previously known systems, it still has the disadvantage that the frame rate of a multi-segment display is different than that of the CRT format data stream. For example, the frame rate of a dual-segment display would be twice that of the CRT format data stream.

Figure 2:
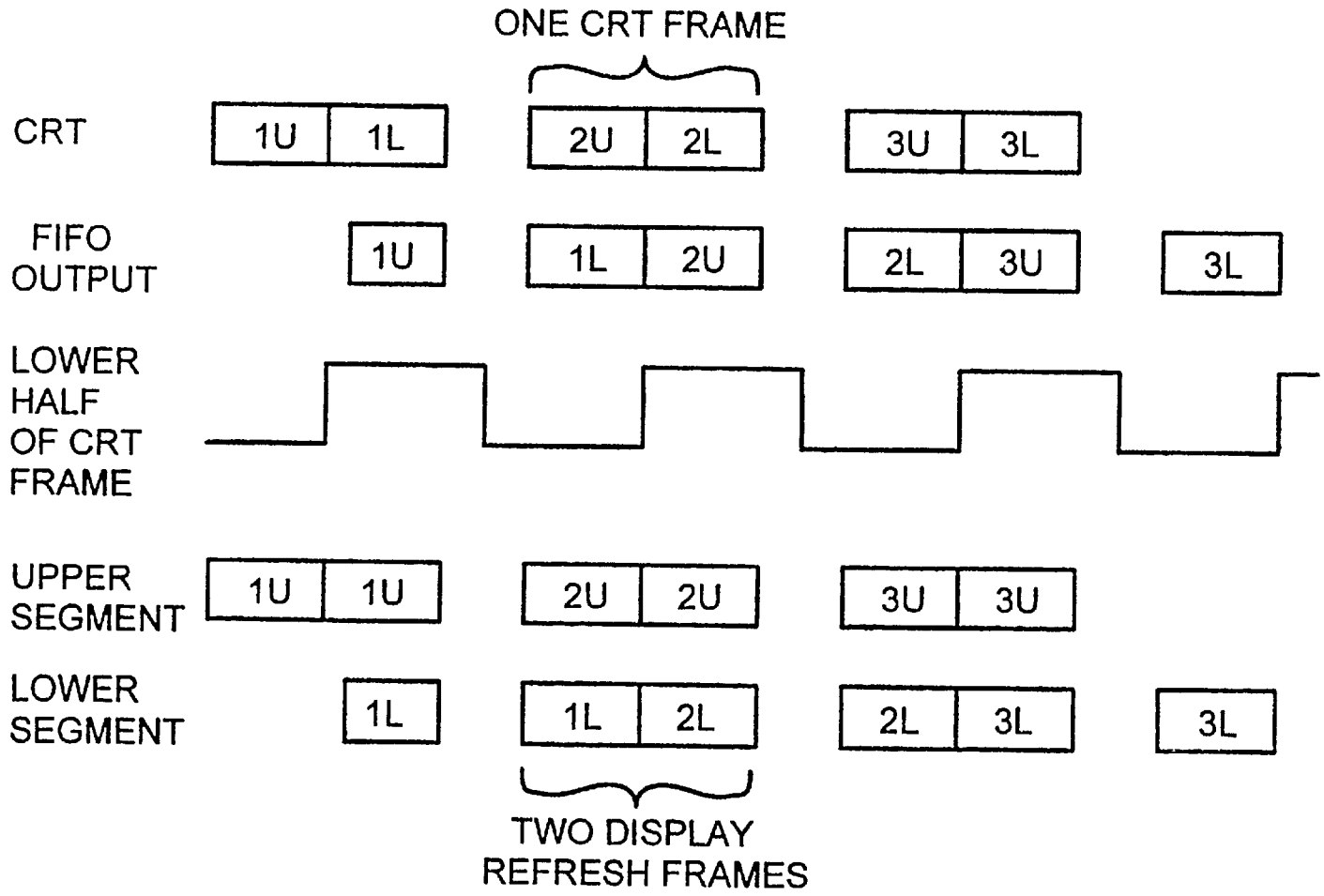
FIG. 2 shows the timing diagram of the data flow of the half frame buffer shown in FIG. 1.

To more fully understand this, refer now to FIG. 2 which is the data flow timing diagram for the architecture shown in FIG. 1. Referring to first line A which is the CRT data stream is provided as shown—that is, first the data stream which represents the upper half of the screen is sent, then the data stream which represents the lower half of the screen. This process is repeated for successive frames. The following line (line B) represents the CRT format data stream delayed one half CRT frame as output from the FIFO. Line C is the control for the two multiplexers in the architecture. Line D shows the data stream that is output to the upper segment of the display. Line E shows the stream that is output to the lower segment. As is noted, the line number of the frame provides the gating function to allow the data stream to either be provided to the upper or lower segment.

As is further seen from the timing diagram, the frame rate of the data to the upper and lower segments is double that of the CRT data stream because the upper and lower segments are each refreshed twice during the period of one CRT refresh frame. As has been before described, these redundant refresh frames substantially lower the number of gray scale patterns that can be displayed.

As has been mentioned before, in the above identified Casio patent and Cirrus patent application, implementations of the lines of data from the CRT data stream are displayed on the panel for two consecutive frames. In so doing, these implementations require that, for example, if a gray level data pattern is 16 frames in length the refresh pattern repeat length must be 32 frames.

Referring now to FIG. 3, two duty cycle patterns are represented for gray level pattern generation. The pattern (a) which represents duty cycle 28 out of 32 can be displayed because of the repeat cycles by the frame buffer system shown in FIG. 1; however, the pattern (b) which represents a duty cycle of 29 out of 32 cannot be displayed by these implementations. The odd cycle patterns cannot be displayed because of the requirement of repetitive data displays by the frame buffer.

Figure 4:
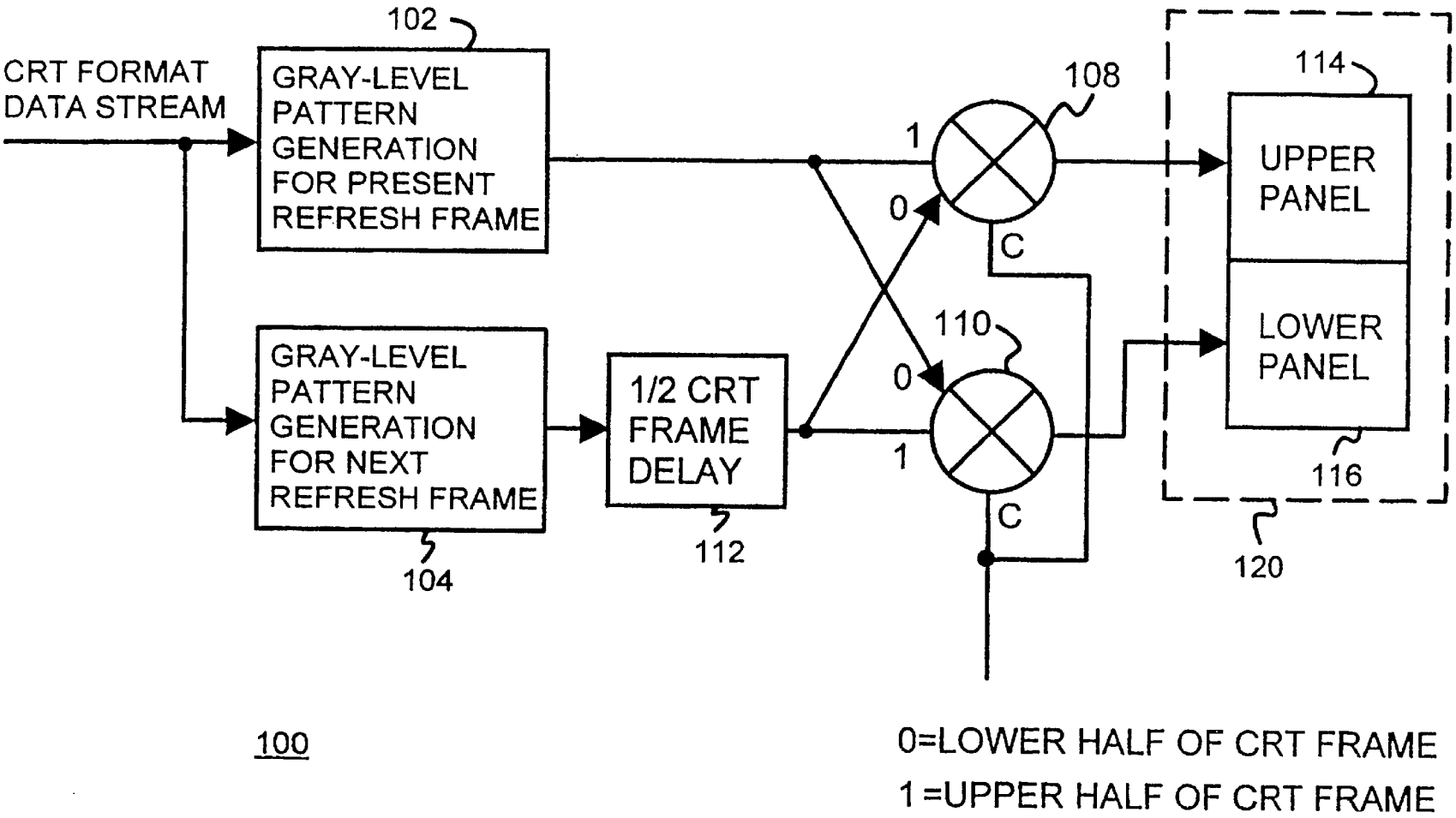
FIG. 4 shows a system for converting CRT data to gray levels in accordance with the present invention.

The present invention overcomes the above mentioned problems through the use of a frame buffer system shown in FIG. 4.

The system 100 as shown in FIG. 4 comprises: first and second gray level data pattern generation blocks 102 and 104 respectively. The output from gray level block 102 is provided to multiplexer 108 and is also provided to multiplexer 110. The output from gray level block 104 is coupled to one-half frame delay block 112. The output of one-half frame delay block 112 is provided to multiplexers 108 and 110. The control signal "c" to multiplexers 108 and 110 allows them to transmit the proper signals at the proper time to the upper and lower panels 114 and 116 of the dual display 120. The control signal can be provided by a counter or the like (not shown) that can count the line numbers of the CRT format data stream, then cause the multiplexer control signal to switch from 0 to 1.

The system of FIG. 4 operates in the following manner. In this embodiment, one CRT data frame generates four gray level refresh frames. In this embodiment, these frames are referred to as the upper and lower frames and the next upper and lower refresh frames. In addition, it should be understood that each CRT frame is divided into an upper and a lower half.

The CRT data format stream is provided to the gray level blocks 102 and 104. Gray level block 102 generates the current upper and lower panel refresh frames. Gray level block 104 generates the next upper and lower refresh frames. Gray level blocks 102 and 104 can be implemented through the system disclosed in copending U.S. patent application Ser. No. 245,875 entitled, "Gray Scales Method and Circuitry for Flat Panel Graphics Display," and assigned to assignee of this patent application.

The current upper and lower panel refresh frames are provided directly to the upper panel 114 of the display 120 if the current upper panel refresh frame occurs during the upper half of the CRT frame via multiplexer 108 and control signal being 1. The current lower panel refresh frame is provided directly to the lower panel 116 of the display 120 if the current panel refresh frame occurs during the lower half of the CRT frame via multiplexer 110 and the control signal being 0.

The next panel refresh frame is provided to one-half frame delay buffer 112. The delayed next lower panel refresh frame is provided to the lower panel 116 of the display 120 if the delayed next lower panel refresh frame occurs during the upper half of the CRT frame via multiplexer 110 and control signal being 1. The delayed next upper panel refresh frame is provided to the upper panel of the display 120 if the delayed next upper panel refresh frame occurs during the lower half of the CRT Frame via multiplexer 108 and control signal being 0. Through the use of the system 100 data for each panel refresh is unique. Hence, two gray level patterns can be generated for each CRT frame provided to the frame buffer system 100.

Figure 5:
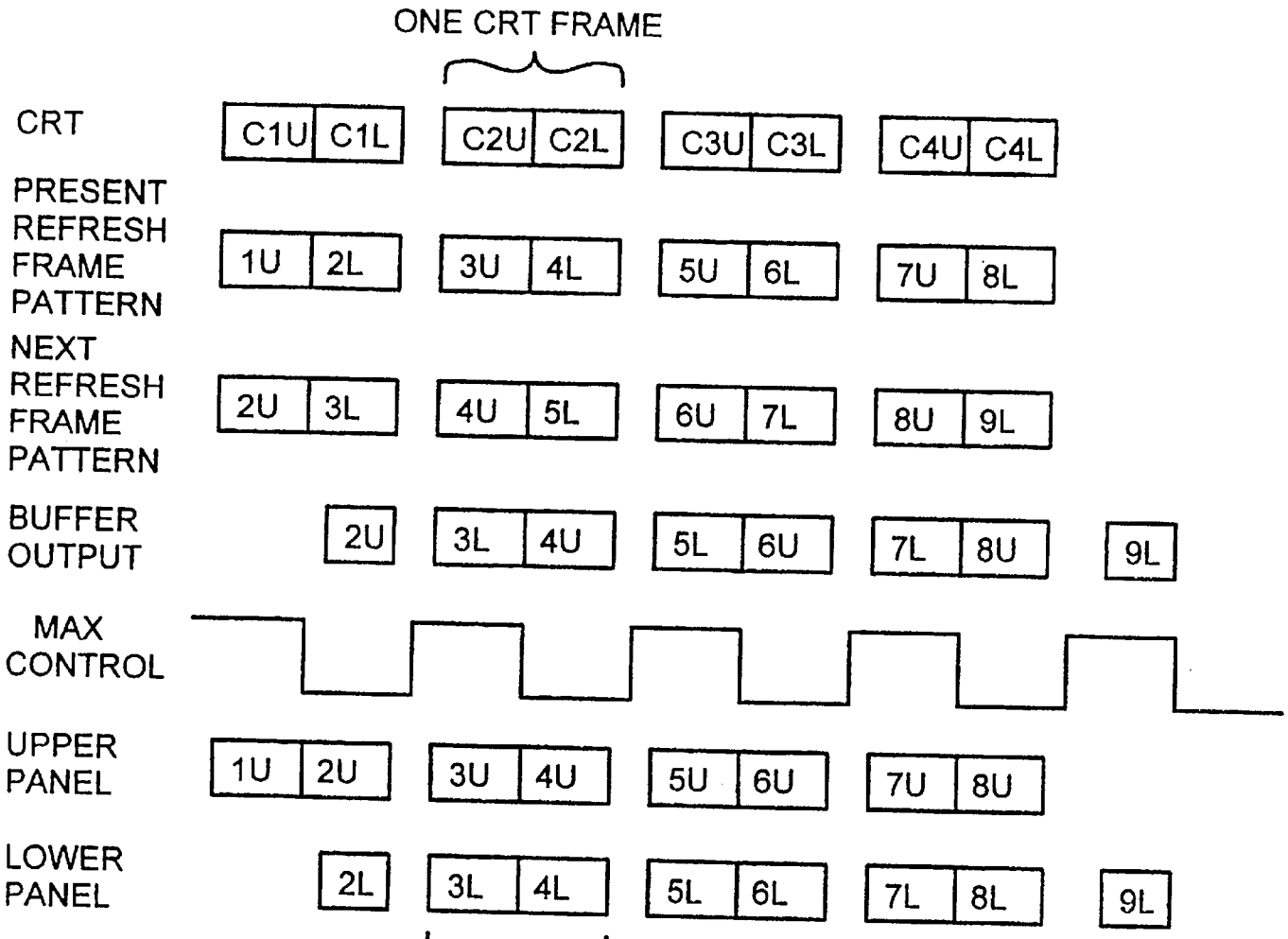
FIG. 5 is a timing diagram of the data flow of the architecture in accordance with the present invention.

Referring now to FIG. 5, shown is the data timing for the frame buffer system of the present invention. In this embodiment, the first line (CRT) is the CRT format data stream. The next two lines are the panel refresh frame pattern for the refresh (a) and next refresh (b). In this embodiment, the current panel refresh frame and the next refresh frame are generated simultaneously. One of ordinary skill in the art will recognize, however, that the frames could be generated sequentially and that would still be within the spirit and scope of the present invention. As has been before mentioned, for this type of frame buffer system, for every CRT frame data (C1U and C1L) (C2U and C2L) (C3U and C3L), there will be [two] *four* panel refresh frames for the dual panel display (1U, 2U, 2L, 3L), (3U, 4U, 4L, 5L) and (5U, 6U, 6L, 7L) respectively. Next there are lines showing the buffer output (c), the control signal (d) and the data residing in upper and lower panels at different points in time (e and f).

Initially, in this embodiment when the control signal is high, the first one-half frame of CRT format data C1U is provided to the frame buffer system 100 (FIG. 4) and current upper panel refresh frame 1U is provided to the upper panel via multiplexer 108 and the next upper panel refresh frame 2U is provided to the frame buffer 112.

When the control signal goes low, the delayed upper panel refresh panel 2U is provided to the upper panel via multiplexer 108. Also, the second one-half of CRT format data C1L is provided to the frame buffer system 100 and current lower panel refresh frame 2L is provided to the lower panel via multiplexer 110 and the next lower panel refresh frame 3L is provided to the frame buffer 112.

Next, when the control signal goes high, the delayed lower panel refresh frame 3L is provided to the lower panel via multiplexer 110. Also, the third one-half of CRT format data C2U is provided to the frame buffer system 100 and current upper panel refresh frame 3U is provided to the upper panel via multiplexer 108 and the next upper panel refresh frame 4U is provided to the frame buffer 112.

When the control signal goes low, the delayed upper panel refresh frame 4U is provided to the upper panel via multiplexer 108. Also, the fourth one-half of CRT format data C2L is provided to the frame buffer system 100 and current lower panel refresh frame 4L is provided to the lower panel via multiplexer 110 and the next lower panel refresh frame 5L is provided to the frame buffer 112.

This process is repeated as shown to provide two unique panel refresh frames from each CRT frame. In so doing, the repeating panel refresh frames for each CRT frame known in the prior art are eliminated. Therefore, on panels where gray levels are generated by changing display patterns from frame to frame, it is now possible to have as many gray level patterns as panel display frame rate will allow. It is well understood in the graphics area that the more gray levels obtained, the more desirable the graphics system. Hence, through the use of the two gray level blocks in conjunction with the controllable multiplexer, a frame buffer architecture has been disclosed that is a significant improvement over those previously known.

It should be understood that although the specific embodiment of the gray level generation block algorithm is described in the before-mentioned co-pending patent application, the algorithms associated with such gray level generation blocks 102 and 104 can be of a wide variety and their use would be within the spirit and scope of the present invention. It is also well understood that although two blocks 102 and 104 are utilized to generate the gray level patterns, the patterns can be generated by any number of blocks.

Hence, numerous and various other arrangements can be readily devised in accordance with these principles by one of ordinary skill in the art without departing from the spirit and scope of the present invention, and is limited only by the following claims.

We claim:

1. A frame buffer system for displaying data on a dual panel display, the dual panel display including an upper panel and a lower panel, the frame buffer system for receiving a cathode ray tube (CRT) data frame having an upper half and a lower half, the frame buffer system for displaying current upper and lower panel refresh frames and next upper and lower panel refresh frames generated from the CRT data frame, the frame buffer system comprising:

first means for generating a gray level pattern from the CRT data frame for the current upper and lower panel refresh frames;

second means for generating a gray level pattern from the CRT data frame for the next upper and lower panel refresh frames;

means coupled to the first generating means for providing the current upper panel refresh frame to the upper panel, responsive to a first state of a control signal and for providing the current lower panel refresh frame to the lower panel responsive to a second state of a control signal;

means for delaying the next *upper and lower* panel refresh [frame] *frames*; and means coupled to the second generating means and the delaying means for providing the delayed next lower panel refresh frame to the lower panel responsive to the first state of a control signal and for providing the delayed next upper panel refresh frame to the upper panel responsive to the second state of a control signal.

2. The frame buffer system of claim 1 in which the current panel refresh frame providing means comprises a first multiplexer and the delayed next panel refresh frame providing means comprises a second multiplexer.

3. The frame buffer system of claim 1 [in] which includes:

means for controlling the [first and second providing means] *current panel refresh frame providing means and the delayed next panel refresh frame providing means*.

4. The frame buffer system of claim 1, in which the delaying means comprises a half-frame buffer.

5. The frame buffer system of claim 1 in which the first generating means and the second generating means generate the current panel refresh frame and the next panel refresh frame simultaneously.

6. A half frame buffer system for displaying data on a dual panel display, the dual panel display including an upper panel and a lower panel, the *half* frame buffer system for receiving a cathode ray tube (CRT) data frame and the *half* frame buffer system for displaying a current upper and lower panel refresh frames and next upper and lower panel refresh frames generated from the CRT data frame, the *half* frame buffer system comprising:

a first means for generating gray level patterns from the CRT data frame for the current upper and lower panel refresh frames;

a second means for generating gray level patterns from the CRT data frame for the next upper and lower panel refresh frame;

a half frame buffer coupled to the second means for delaying the next *upper and lower* panel refresh [frame] *frames*;

a first multiplexer *coupled to the first means* for providing the current upper panel refresh frame to the upper panel responsive to a first state of a control signal and for providing the current lower panel refresh frame to the lower panel responsive to a second state of the control signal *during the lower half of the CRT data frame*; and a second multiplexer [means] coupled to the half frame buffer for providing the delayed next [upper] *lower* panel refresh frame to the lower panel responsive to the first state of the [first] control signal and for providing the delayed next [lower] *upper* panel refresh frame to the [lower] *upper* panel responsive to [a] *the* second state of the control signal during the lower half of the CRT data frame.

* * * * *

UNITED STATES PATENT AND TRADEMARK OFFICE

CERTIFICATE OF CORRECTION

PATENT NO. : RE 37,069 P2
DATED : February 27, 2001
INVENTOR(S) : Tjandrasuwita et al.

It is certified that error appears in the above-identified patent and that said Letters Patent is hereby corrected as shown below:

Title page,
ABSTRACT, line 9, replace "An" with -- an --.

Column 4,
Line 37, after "as the" insert -- current --.
Line 46, replace "copending" with -- co-pending --.
Line 48, after "assigned to" insert -- the --.

Column 5,
Line 10, after "for the" insert -- current --.

Signed and Sealed this

Fifth Day of March, 2002

*Attest:*

*Attesting Officer*

JAMES E. ROGAN
*Director of the United States Patent and Trademark Office*